United States Patent
Kodama et al.

(10) Patent No.: US 7,499,201 B2
(45) Date of Patent: Mar. 3, 2009

(54) IMAGE READING APPARATUS, METHOD OF READING IMAGE, AND IMAGE READING SYSTEM

(75) Inventors: Kenichi Kodama, Kanagawa (JP); Setsuji Tatsumi, Kanagawa (JP); Kanji Nagashima, Kanagawa (JP); Seiichiro Oku, Kanagawa (JP); Yoshiro Yamazaki, Kanagawa (JP); Toshiya Kojima, Kanagawa (JP); Seiichi Inoue, Kanagawa (JP); Naoki Kusunoki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1037 days.

(21) Appl. No.: 10/744,103

(22) Filed: Dec. 24, 2003

(65) Prior Publication Data
US 2004/0190080 A1    Sep. 30, 2004

(30) Foreign Application Priority Data
Dec. 26, 2002    (JP) .............................. 2002-376853

(51) Int. Cl.
*H04N 1/04*    (2006.01)

(52) U.S. Cl. ...................................... 358/474; 345/905
(58) Field of Classification Search .................. 358/1.1, 358/1.2, 1.6, 1.9, 1.13, 474, 475; 345/905
See application file for complete search history.

(56) References Cited

U.S. PATENT DOCUMENTS

| 4,751,584 | A | * | 6/1988 | Midorikawa | ................. | 358/401 |
| 6,724,990 | B2 | * | 4/2004 | Fredlund et al. | ............. | 396/305 |
| 2003/0016404 | A1 | * | 1/2003 | Tecu et al. | ................... | 358/506 |

FOREIGN PATENT DOCUMENTS

| JP | 09-101864 A | 4/1997 |
| JP | 2002-104721 A | 4/2002 |

* cited by examiner

*Primary Examiner*—Thomas D Lee
(74) *Attorney, Agent, or Firm*—Sughrue Mion, PLLC

(57) ABSTRACT

An object of the invention is to obtain a high-quality image by reading an image of an electronic paper with high accuracy. When optically copying the electronic paper, a controller reads out display characteristics such as a reading resolution and a reading light quantity from a display characteristic memory of the electronic paper. The controller performs optical copying processing after setting optimal conditions on the basis of the display characteristics which have been read out from the display characteristic memory.

8 Claims, 8 Drawing Sheets

F I G. 5
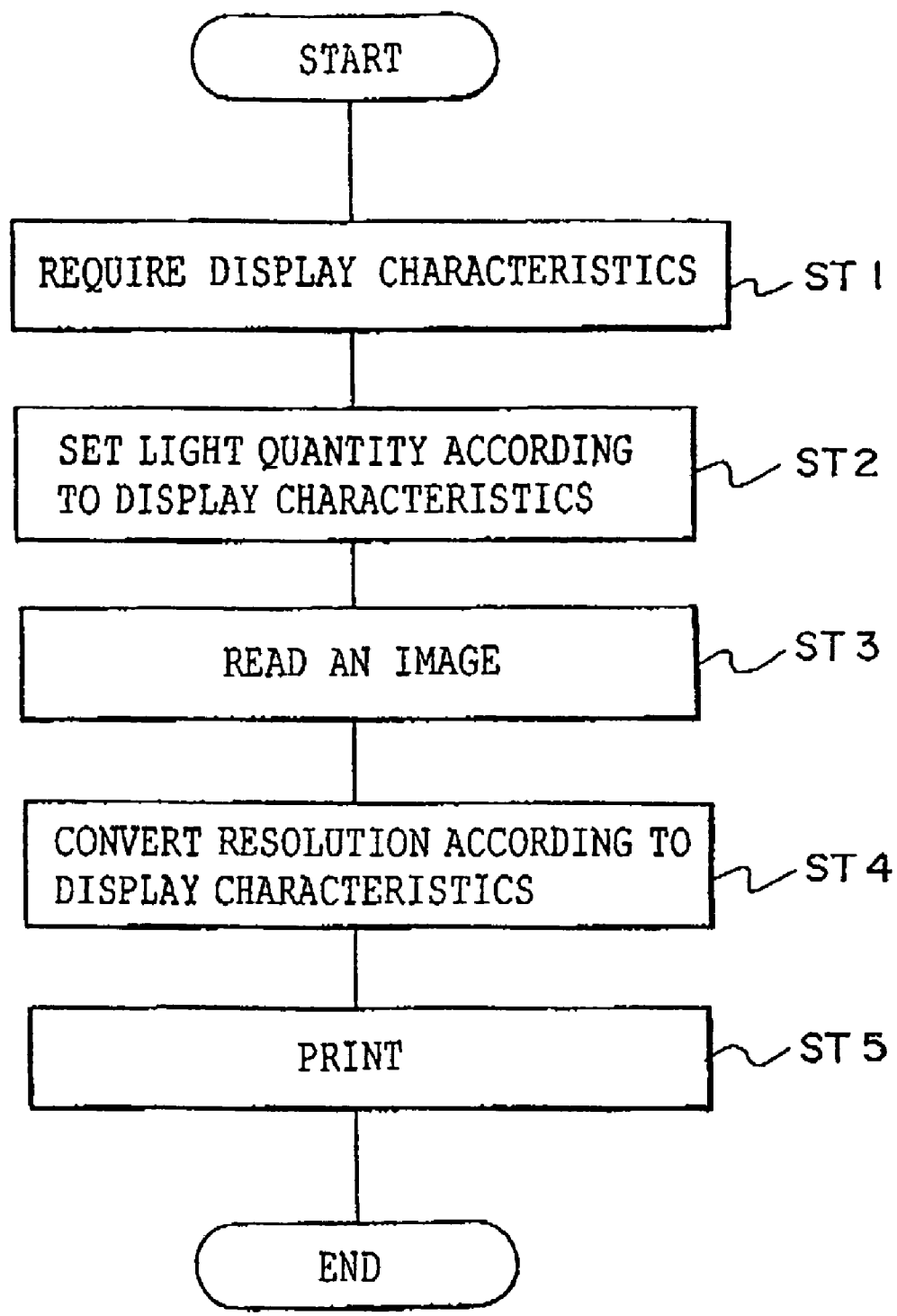

FIG. 6

| PIXEL NO. | TRANSFORMATION |
|---|---|
| 1 | (Pb01×1.00+Pb02×0.05) /2 |
| 2 | (Pb02×0.95+Pb03×0.10) /2 |
| 3 | (Pb03×0.90+Pb04×0.15) /2 |
| 4 | (Pb04×0.85+Pb05×0.20) /2 |
| 5 | (Pb05×0.80+Pb06×0.25) /2 |
| 6 | (Pb06×0.75+Pb07×0.30) /2 |
| 7 | (Pb07×0.70+Pb08×0.35) /2 |
| 8 | (Pb08×0.65+Pb09×0.40) /2 |
| 9 | (Pb09×0.60+Pb10×0.45) /2 |
| 10 | (Pb10×0.55+Pb11×0.50) /2 |
| 11 | (Pb11×0.50+Pb12×0.55) /2 |
| 12 | (Pb12×0.45+Pb13×0.60) /2 |
| 13 | (Pb13×0.40+Pb14×0.65) /2 |
| 14 | (Pb14×0.35+Pb15×0.70) /2 |
| 15 | (Pb15×0.30+Pb16×0.75) /2 |
| 16 | (Pb16×0.25+Pb17×0.80) /2 |
| 17 | (Pb17×0.20+Pb18×0.85) /2 |
| 18 | (Pb18×0.15+Pb19×0.90) /2 |
| 19 | (Pb19×0.10+Pb20×0.95) /2 |
| 20 | (Pb20×0.05+Pb21×1.00) /2 |

IMAGE READING APPARATUS, METHOD OF READING IMAGE, AND IMAGE READING SYSTEM

CROSS REFERENCE TO RELATED APPLICATION

This application claims priority under 35 USC 119 from Japanese Patent Application No. 2002-376853, the disclosure of which is incorporated by reference herein.

BACKGROUND OP THE INVENTION

1. Field of the Invention

The present invention relates to an image reading apparatus, a method of reading an image, and an image reading system and particularly relates to an image reading apparatus, a method of reading an image, and an image reading system which are suitable for use in optically reading an image displayed on a so-called electronic paper.

2. Description of the Related Art

As the need to share electronic documents and paper documents increases, the use of electronic paper (digital paper) becomes advantageous as it possesses both the properties of an electronic display and a paper medium. Electronic paper includes an information storing section which stores information and a thin image display surface which displays the information stored in a memory (for example, see FIG. 5 of Japanese Patent Application Laid-Open (JP-A) No. 9-101864 and paragraph 5 of JP-A No. 2002-104721).

In the electronic paper, various images are displayed by a dot structure. Accordingly, in the case where a copying machine copies the image displayed on the electronic paper, when reading resolution, light quantity, and the like are set the same as for a paper medium, the dot structure and the reading resolution may interfere with each other to generate moire.

The copying machine can prevent the moire, if the dot structure of the electronic paper is recognized in advance. The dot structure of the electronic paper differs according to an image display mode. If the copying machine can distinguish a recording mode (the image display mode) of the electronic paper, the copying machine can detect the dot structure.

For example, JP-A No. 2002-104721 describes distinguishing one of an electrophoresis mode, a thermal rewritable mode, and a liquid crystal mode as the image display mode of an electronic paper.

However, when the technique described in JP-A No. 2002-104721 is adopted for a copying machine, there is a problem in that a configuration of the copying machine becomes very complicated.

Subjects of copying machines include reflective/transparent originals of a photograph, printed matter, an object printed with a laser printer or an inkjet printer, a hand-drawn document, a drawing, a picture, and the like. That is to say, copying machines do not copy an original which emits light itself.

Displays which are not provided with a light source like the thermal rewritable mode, self-light-emitting type displays such as an electroluminescent (EL) display which utilize organic EL or inorganic EL, a field emission display (FED), and a plasma display, and displays which are provided with a display section and a backlight (light source) like a liquid crystal display are included among the displays of the electronic paper. However, current copying machines have the problem that an image displayed on the electronic paper can not be copied with high quality corresponding to these various image display modes of the electronic paper.

Further, there is a high possibility of generating a flaw on a surface of the electronic paper, because the electronic paper is used repeatedly. In this case, when a copying machine reads the electronic paper with the flaw, there is a possibility of generating a defect in the read image, so that there is also the problem that the image can not be copied with high quality.

The electronic paper is treated like a paper medium. For example, sometimes letters and symbols are written on the electronic paper. In this case, there is a need for the original information recorded in the electronic paper and the handwritten information to be read while distinguishing the original information from the handwritten information. However, current copying machines and image reading apparatuses can not read both the original information recorded in the electronic paper and the handwritten information while distinguishing the original information from the handwritten information.

SUMMARY OF THE INVENTION

In view of the foregoing, it is an object of the present invention to provide an image reading apparatus, a method of reading an image, and an image reading system which can obtain a high-quality image by reading an image of an electronic paper with high accuracy or by distinguishing original information of the electronic paper from information added in longhand.

A first aspect of the invention is to provide an image reading apparatus comprising: a readout section which reads out display characteristics of an image from a thin display device in which the display characteristics of the image for when the image is displayed are recorded; and an image reading section which reads the image displayed on a display section of the thin display device, on the basis of the display characteristics read out by the readout section.

The thin display device records the display characteristics of the image for when the image is displayed. Here, it is preferable that the thin display device has, for example, the display section displaying the image and memory means for storing the display characteristics of the image displayed on the display section A pixel structure, an image type indicating a kind of the image such as photographs or letters, the resolution, a conversion method (area or density), gradation, contrast, an open-area ratio of a pixel mask, and the like are preferable examples of the display characteristics.

In order to read out the display characteristics from the thin display device, the readout section may communicate with the thin display device by wire or wireless. Further, the display characteristics may be configured to be read out from an IC chip, a bar code, or the like, which is included in the electronic paper.

The image reading section reads the image displayed on the display section on the basis of the display characteristics read out by the readout section. For example, the image reading section can control a reading light quantity on the basis of the display characteristics to read the image displayed on the display section.

Therefore, according to the first aspect of the invention, by reading the image displayed on the display section on the basis of the display characteristics read out from the thin display device, the image can be read without losing image quality and a high-quality image can be obtained.

A second aspect of the invention is to provide an image reading apparatus comprising: a readout section which reads out display characteristics of an image from a thin display device in which the display characteristics of the image for when the image is displayed are recorded; an image reading section which reads the image displayed on a display section of the thin display device; and an image processing section which performs image processing with respect to the image read by the image reading section, on the basis of the display characteristics read out by the readout section.

The thin display device is the same as that of the first aspect. Here, the image processing section performs image processing with respect to the image read by the image reading section on the basis of the display characteristics read out by the readout section. The image processing includes, for example, resolution converting processing.

Therefore, according to the second aspect of the invention, the display characteristics of the read image can be considered by performing the image processing with respect to the read image on the basis of the display characteristics read out from the thin display device, and as a result, a high-quality image can be obtained.

The display characteristics may be recorded in the form of a bar code on a surface of the thin display device. In this case, a high-quality image can be read from the thin display device without using a special communication method for transmitting and receiving the display characteristics.

A third aspect of the invention is to provide an image reading apparatus comprising: a type determining section which determines a display mode of a thin display device; a reading light source which irradiates the thin display device with light; a light quantity setting section which sets a light quantity of the reading light source on the basis of the display mode determined by the type determining section; and an image reading section which reads the image displayed on the thin display device.

The type determining section determines the type of light emission (display mode) of the thin display device, e.g., a non-light-emitting type, a light-emitting type, or a non-light-emitting type with a light source. The light quantity setting section sets the light quantity on the basis of the determination result of the type determining section. The reading light source irradiates the thin display device with light having the set light quantity. Further, it is preferable to add a function of determining a light-emitting quantity, a light-emitting wavelength, or the like of the thin display device to the type determining section which determines the type of light emission of the thin display device and set the light quantity, the light-emitting wave length, or the like of the reading apparatus in accordance with its determination result.

Therefore, according to the third aspect of the invention, since the image of the thin display device is read by setting the light quantity of the reading light source in accordance with the type of light-emission of the thin display device, even if the type of light-emission of the thin display device is different, a high-quality image can always be obtained. In the case where the thin display device is equipped with the light source or the like, the setting of the light quantity of the thin display device may be used in combination with the setting of the light quantity of the reading apparatus.

A fourth aspect of the invention is to provide an image reading apparatus comprising: an image reading section which reads an image displayed on a thin display device; a controlling section which controls switching between a first mode in which the thin display device is caused to emit light so as to display the image, and a second mode in which the thin display device is not caused to emit light and the image is not displayed; and a recognizing section which recognizes the image displayed on the thin display device and an image added to a display surface of the thin display device, on the basis of an image read by the image reading section in the first mode and an image read by the image reading section in the second mode.

The controlling section controls the switching between the first mode and the second mode. The first mode is an operation mode which performs control so that the image is displayed by causing the thin display device to emit light. The second mode is an operation mode which performs control so that the thin display device is not caused to emit light and the image is not displayed.

Therefore, according to the fourth aspect of the invention, each image can be separately dealt with in such a manner that the recognizing section recognizes the image displayed on the thin display device and the image added to the display surface of the thin display device while distinguishing the displayed image from the additional image on the basis of the image read in the first mode and the image read in the second mode.

In the case where the thin display device is the so-called non-light-emitting type, it is preferable that the image reading apparatus further comprises a reading light source which irradiates the image displayed on the thin display device with light.

In order to emphasize the image added to the display surface of the thin display device, as another form of the second mode, the controlling section may perform control so that a white background is output over the display surface of the thin display device. Further, as long as the image added to the display surface of the thin display device can be emphasized, the controlling section may perform control so that another uniform color such as gray is output over the display surface.

A fifth aspect of the invention is to provide an image reading apparatus comprising: a display controlling section which performs control so as to display an image on a thin display device or so as not to display the image; an image reading section which reads a display surface of the thin display device; and a recognizing section which recognizes the image displayed on the thin display device, on the basis of an image read by the image reading section when the image is displayed on the thin display device and an image read by the image reading section when the image is not displayed on the thin display device.

The display controlling section performs control so as to display the image on the thin display device or so as not to display the image. The image reading section reads the display surface of the thin display device, when the image is displayed on the thin display device, or when the image is not displayed on the thin display device.

When the image is not displayed on the thin display device, the image-read by the image reading section is an image of a flaw of the display surface. On the other hand, when the image is displayed on the thin display device, the image read by the image reading section is an image which is displayed on the thin display device and influenced by the flaw of the display surface.

Therefore, according to the fifth aspect of the invention, the influence of the flaw of the display surface can be eliminated to obtain a high-quality image in such a manner that the recognizing section recognizes the image displayed on the thin display device on the basis of the image read when the image is displayed on the thin display device and the image read when the image is not displayed on the thin display device.

A sixth aspect of the invention is to provide an image reading system comprising a thin display device having a display section which displays an image based on display image data and has a surface upon which an additional image can be drawn; and an image reading apparatus having a reading section which reads the display section, and a controlling section which controls the reading section so as to read the display section when the image based on the display image data is not displayed on the display section.

A display medium utilizing any display mode such as the electrophoresis mode, the thermal rewritable mode, an EL mode, a field emission mode, a plasma mode, or the liquid crystal mode or the like may be used as the thin display device.

The controlling section may further control the reading section so as to read the display section when the image based on the display image data is displayed on the display section.

The image reading apparatus may further include a synthesizing section which synthesizes read image data obtained by reading of the display section by the reading section when the image based on the display image data is not displayed on the display section and read image data obtained by reading of the display section by the reading section when the image based on the display image data is displayed on the display section. The image reading apparatus may also further include a synthesizing section which synthesizes the display image data and the read image data obtained by reading of the display section by the reading section when the image based on the display image data is not displayed on the display section.

A seventh aspect of the invention is to provide an image reading apparatus comprising: an image reading section which reads a display surface of a thin display device; and an image processing section which performs image processing with respect to first read image data, on the basis of the first read image data obtained by reading of the display surface by the image reading section when an image is displayed on the thin display device and second read image data obtained by reading of the display surface by the image reading section when the image is not displayed on the thin display device.

The image processing section may recognize data corresponding to a flaw of the display surface based on the second read image data and substitute other data for the data at a position corresponding to the position of the flaw in the first read image data. The substituting data may be determined by interpolation calculation from data located in surroundings of the position corresponding to the position of the flaw in the first read image data.

An eighth aspect of the invention is to provide a method of reading an image comprising the steps of: reading out display characteristics from a thin display device for when the thin display device displays the image; setting a condition under which the image is to be read by an image reading apparatus for reading the image displayed on the thin display devise, on the basis of the display characteristics which have been read out, and reading the image under the set condition.

The condition under which the image is to be read may be at least one of a light quantity emitted from the image reading apparatus and a reading resolution of the image reading apparatus. Image processing of the image which has been read by the image reading apparatus may be performed on the basis of the display characteristics which have been read out. The image processing may be conversion of resolution of the read image.

The method of reading an image may further comprise a step of determining a display mode of the thin display device to set the condition under which the image is to be read, a light quantity emitted from the image reading apparatus may be set on the basis of the determined display mode.

A ninth aspect of the invention is to provide a method of reading an image comprising the step of reading a display section of the thin display device using an image reading apparatus when the image based on display image data is not displayed on the display section of the thin display device, in which an additional image can be drawn on a surface of the display section which displays the image based on the display image data.

Here, the display section may be further read when the image based on the display image data is displayed on the display section. Read image data obtained by reading the display section when the image based on the display image data is not displayed on the display section and read image data obtained by reading the display section when the image based on the display image data is displayed on the display section may be synthesized. Alternatively, the display image data and the read image data which is obtained by reading the display section when the image based on the display image data is not displayed on the display section may be synthesized.

A tenth aspect of the invention is to provide a method of reading an image comprising the steps of: performing first reading processing in which a display surface of a thin display device is read using an image reading section when the image is displayed on the display surface; performing second reading processing in which the display surface of the thin display device is read using the image reading section when the image is not displayed on the display surface; and performing image processing with respect to first read image data on the basis of the first read image data obtained by the first reading processing and second read image data obtained by the second reading processing.

The step of performing the image processing may further include recognizing data corresponding to a flaw of the display surface based on the second read image data, and substituting other data for the data at a position corresponding to the position of the flaw in the first read image data.

BRIEF DESCRIPTION OF THE DRAWINGS

FIG. 5 is a flow chart explaining a procedure when a controller of the copying machine copies an image of the electronic paper.

FIG. 6 shows an image conversion map for converting a read image having 420 dpi into a copy image having 400 dpi.

DETAILED DESCRIPTION OF THE INVENTION

Referring to the accompanying drawings, preferred embodiments of the present invention will be described in detail below.

First Embodiment

Figure 1:
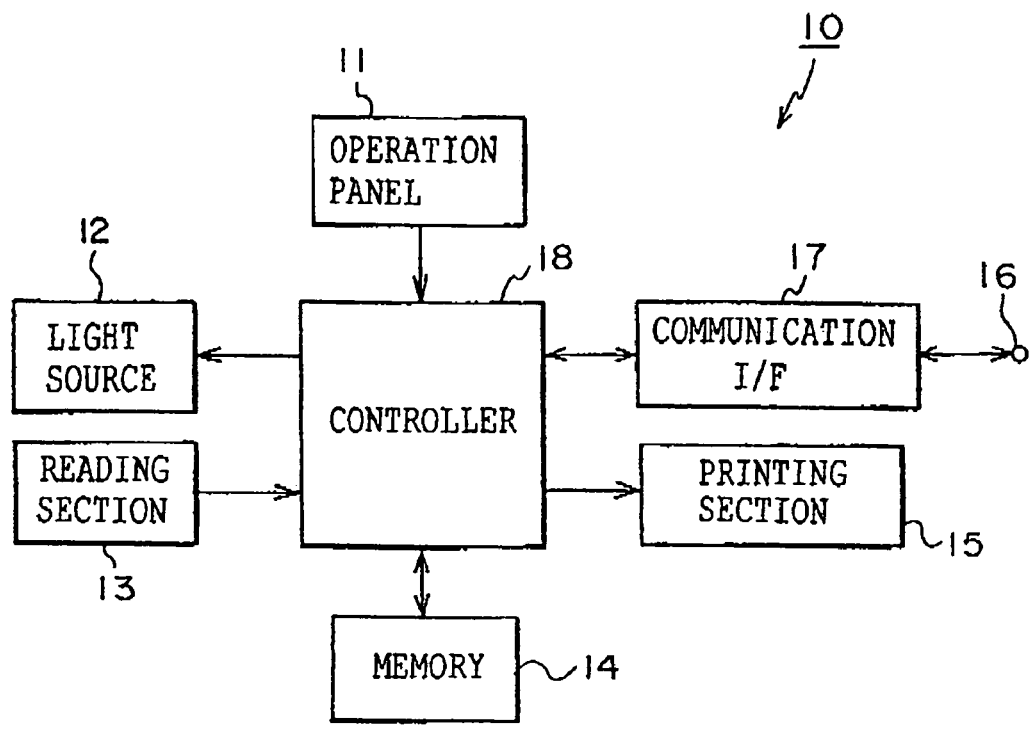
FIG. 1 is a block diagram showing a configuration of a copying machine according to an embodiment of the present invention.

FIG. 1 is a block diagram showing a configuration of a copying machine 10 according to a first embodiment of the invention.

The copying machine 10 includes an operation panel 11 which performs a setting operation, a reading light source 12 which, if necessary, emits light when reading an original, a reading section 13 which is a scanner for optically reading an electronic paper 20 described later, a memory 14 which stores an image read by the reading section 13 and other pieces of information, a printing section 15 which prints the image read by the reading section 13, a communication interface (hereinafter referred to as a "communication I/F") 17 which performs data communication with the outside through an input/output terminal 16, and a controller 18 which controls the entire copying machine 10.

The controller 18 can control image reading conditions of the reading section 13 according to the setting operation of the operation panel 11 or information supplied from the outside through the communication I/F 17. For example, in a case where the read image has 420 to 440 dpi while a copy image at the time of printing has 400 dpi, the controller 18 converts the read image into a copy image having 400 dpi. The controller 18 can also control printing conditions of the printing section 15.

Figure 2:
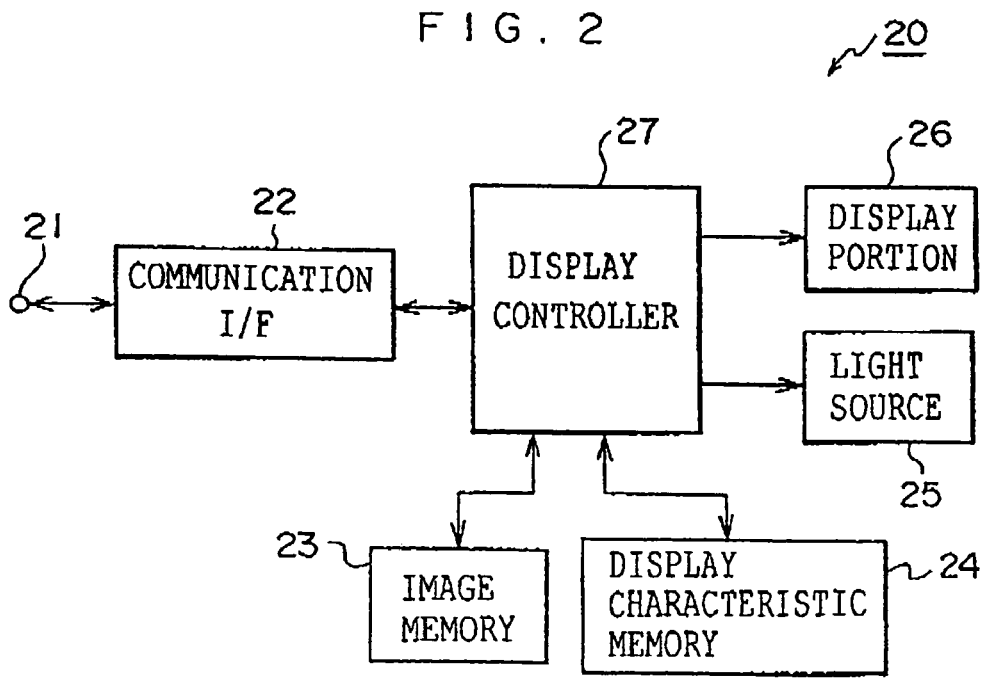
FIG. 2 is a block diagram showing the configuration of an electronic paper.

FIG. 2 is a block diagram showing a configuration of the electronic paper 20. As in the case with a paper medium, the electronic paper 20 is a recording medium in which image, characters, or the like are recorded. In the present embodiment, the electronic paper 20 is the original which is copied by the copying machine 10.

Specifically, the electronic paper 20 includes a communication I/F 22 which performs data communication with the outside through an input/output terminal 21, an image memory 23 which stores the image, a display characteristic memory 24 which stores display characteristics for when the image is displayed, a paper light source 25 which emits light when displaying the image, a display section 26 which displays the image stored in the image memory 23, and a display controller 27 which controls the entire electronic paper 20.

The communication I/F 22 receives the image which is transmitted from the outside through the input/output terminal 21, supplies the image to the display controller 27, and sends a control signal from the outside to the display controller 27.

The image memory 23 stores the image to be displayed on the display section 26. The image stored in the image memory 23 may be one frame or a plurality of frames.

The display characteristic memory 24 stores the display characteristics concerning the image to be displayed on the display section 26. Example of the display characteristics include an image kind indicating the kind of the image such as a photograph or characters, a resolution, a conversion method (area or density), a gradation, a contrast, an open-area ratio of a pixel mask, and the like.

Though the present embodiment has the individual image memory 23 and display characteristic memory 24, the individual image memory 23 and display characteristic memory 24 may be configured in the form of one memory.

Figure 3:
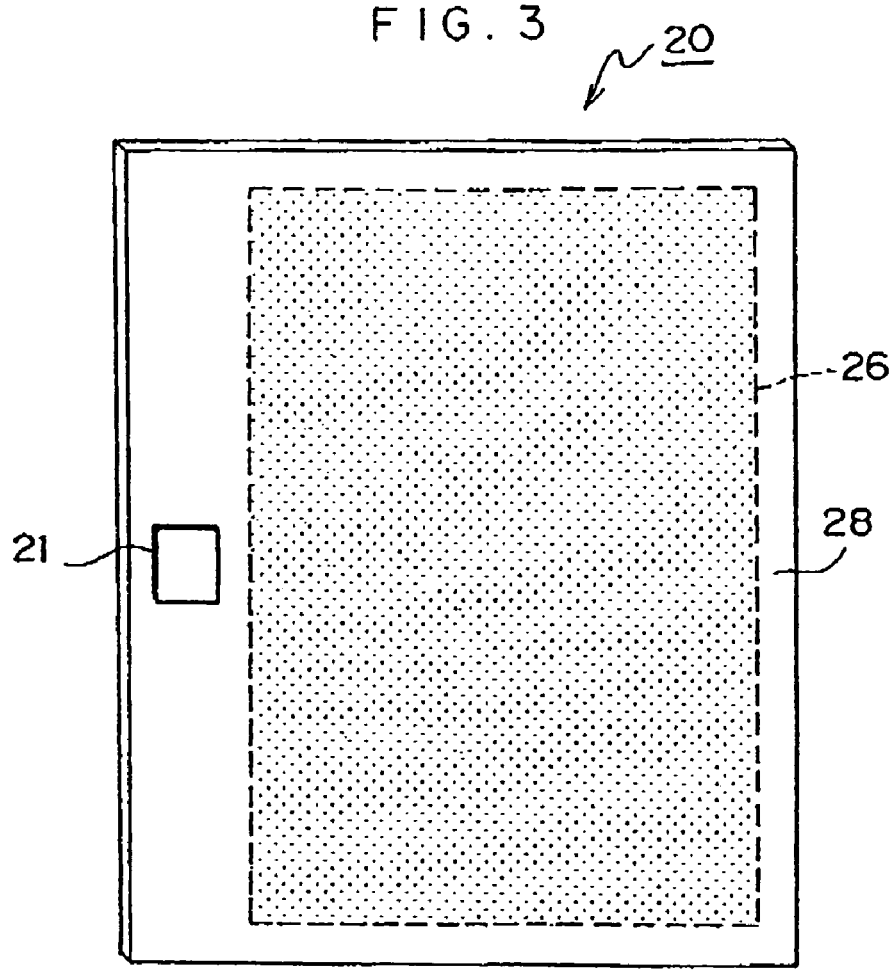
FIG. 3 is a plan view of the electronic paper.
Figure 4:
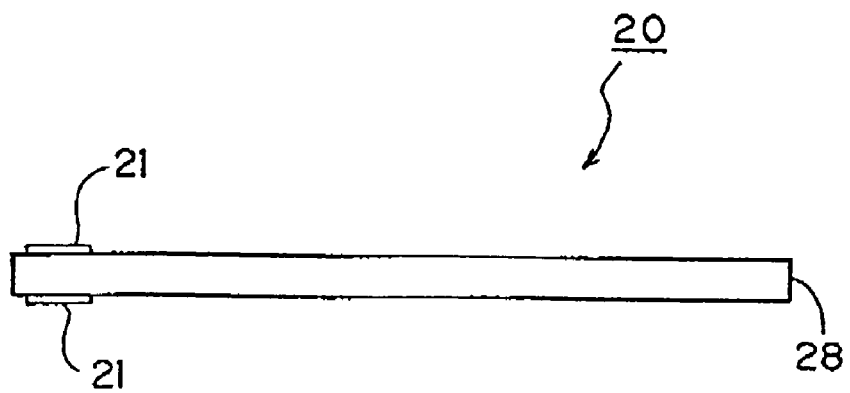
FIG. 4 is a side view of the electronic paper.

FIG. 3 is a plan view of the electronic paper 20, and FIG. 4 is a side view of the electronic paper 20. The electronic paper 20 is covered with, for example, a rectangular plate-shaped casing 28. The display section 26 is provided on one face side of the casing 28. The input/output terminals 21 are provided so as to project toward the outside from both faces of the casing 28.

The copying machine 10 having the above-described configuration performs the following processing in copying the image displayed on the electronic paper 20.

Before the copying process is performed by the copying machine 10, an operator connects the input/output terminal 16 of the copying machine 10 and the input/output terminal 21 of the electronic paper 20. This results in a mutually communicable state between the copying machine 10 and the electronic paper 20. The mutually communicable state between the copying machine 10 and the electronic paper 20 may be achieved by either wire or wireless. Then, the operator sets the electronic paper 20 at a predetermined reading position of the copying machine 10.

FIG. 5 is a flow chart explaining a procedure when the controller 18 of the copying machine 10 copies the image of the electronic paper 20. When performance of the copying processing is instructed through the operation panel 11, the controller 18 performs the processing which starts from the following step In step ST1, the controller 18 requests the transmission of the display characteristics from the display controller 27 through the communication I/F 17, the input/output terminal 16, the input/output terminal 21 of the electronic paper 20, and the communication I/F 22. Then, the processing proceeds to step ST2.

At this point, when the display controller 27 of the electronic paper 20 receives the transmission request for the display characteristics from the copying machine 10, the display controller 27 reads out the display characteristics from the display characteristic memory 24 and transmits them to the controller 18 of the copying machine 10.

In step ST2, when the controller 18 receives the display characteristics transmitted from the electronic paper 20, the controller 18 sets a reading light quantity according to the display characteristics. Then, the processing proceeds to step ST3.

In step ST3, while the controller 18 controls the light emission of the reading light source 12 so that the light emission corresponds to the reading light quantity set in step ST2, the controller 18 causes the reading section 13 to read the image displayed on the electronic paper 20. The controller 18 stores the image read by the reading section 13 in the memory 14, and the processing proceeds to step ST4.

In step ST4, the controller 18 sets the resolution on the basis of the display characteristics and performs the image processing with respect to the read image according to the set resolution. The specific processing is as follows.

The controller 18 stores a plurality of image conversion maps in advance. When the controller 18 receives the display characteristics (for example, reading resolution 420 dpi) of the read image of the electronic paper 20, the controller 18 selects the image conversion map corresponding to the display characteristics and converts the read image having 420 dpi into the copy image having 400 dpi.

FIG. 6 shows the image conversion map for converting the read image having 420 dpi into the copy image having 400 dpi. Each pixel constituting the read image is indicated by $Pb_i$ ($i=1, 2, 3 \ldots$). Each pixel constituting the copy image is indicated by a pixel number (pixel No.).

The controller 18 converts the read image having 21 pixels into the copy image having 20 pixels on the basis of the conversion formula of the image conversion map. The pixel 21 ($Pb_{21}$) of before the image conversion is overlapped on the pixel 20 (pixel No. 20) of after the image conversion. Accordingly, the controller 18 repeatedly calculates the conversion formula of the image conversion map shown in FIG. 6 for the. pixel 22 and subsequent pixels (23, 24, 25, . . . ) of before the image conversion. Then, the processing proceeds to step ST5.

In step ST5, the controller 18 supplies, to the printing section 15, the copy image in which the image processing has been carried out and causes the printing section 15 to print the image, so as to complete the sequence of copying process.

As described above, when optically copying the electronic paper 20, the copying machine according to the invention can perform the optical copying processing after setting the optimum conditions by reading out such display characteristics as the reading resolution and the reading light quantity from the electronic paper 20. Further, the copying machine 10 can easily read out the display characteristics from the display characteristic memory 24 of the electronic paper 20, so that the optimum reading conditions of the electronic paper 20 can be decided without a complicated configuration. Accordingly, the copying machine 10 can print a high-quality image in accordance with the resolution of the display section 26 of the electronic paper 20 without generating a moire.

The invention is not limited to the first embodiment, and it may be modified as follows.

For example, the electronic paper 20 may be configured such that the display characteristics are not stored in the display characteristic memory 24, but rather such that a bar code indicating the display characteristics is shown on a surface of the casing 28. In this case, the copying machine 10 may further include a bar code reader. Accordingly, the copying machine 10 can read the display characteristics of the electronic paper 20 through the bar code reader even if the copying machine 10 is not directly connected to the electronic paper 20, and complicated means for information transmission are not required. Similarly to the above-described embodiment, the copying machine 10 can set the resolution and the light quantity on the basis of the display characteristics which have been read.

In the embodiment, an electronic paper holding apparatus carrying out mutual communication between the copying machine 10 and the electronic paper 20 may be provided.

Figure 7:
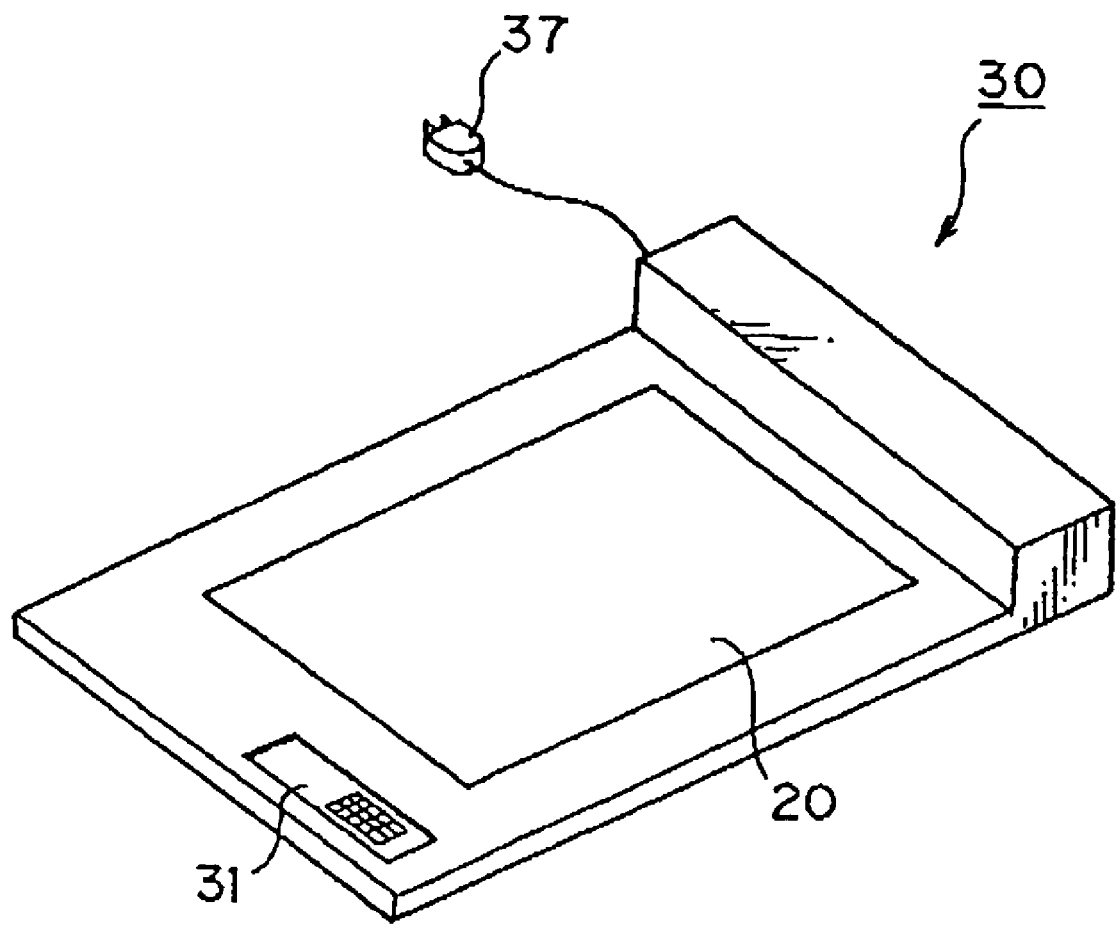
FIG. 7 is a perspective view of an electronic paper holding apparatus.

FIG. 7 is a perspective view of an electronic paper holding apparatus 30. The electronic paper holding apparatus 30 retains the electronic paper 20 during communication between the copying machine 10 and the electronic paper 20. Further, the electronic paper holding apparatus 30 can supply electric power input through an electric power input terminal 37 not only to a main body but also to the electronic paper 20.

Figure 8:
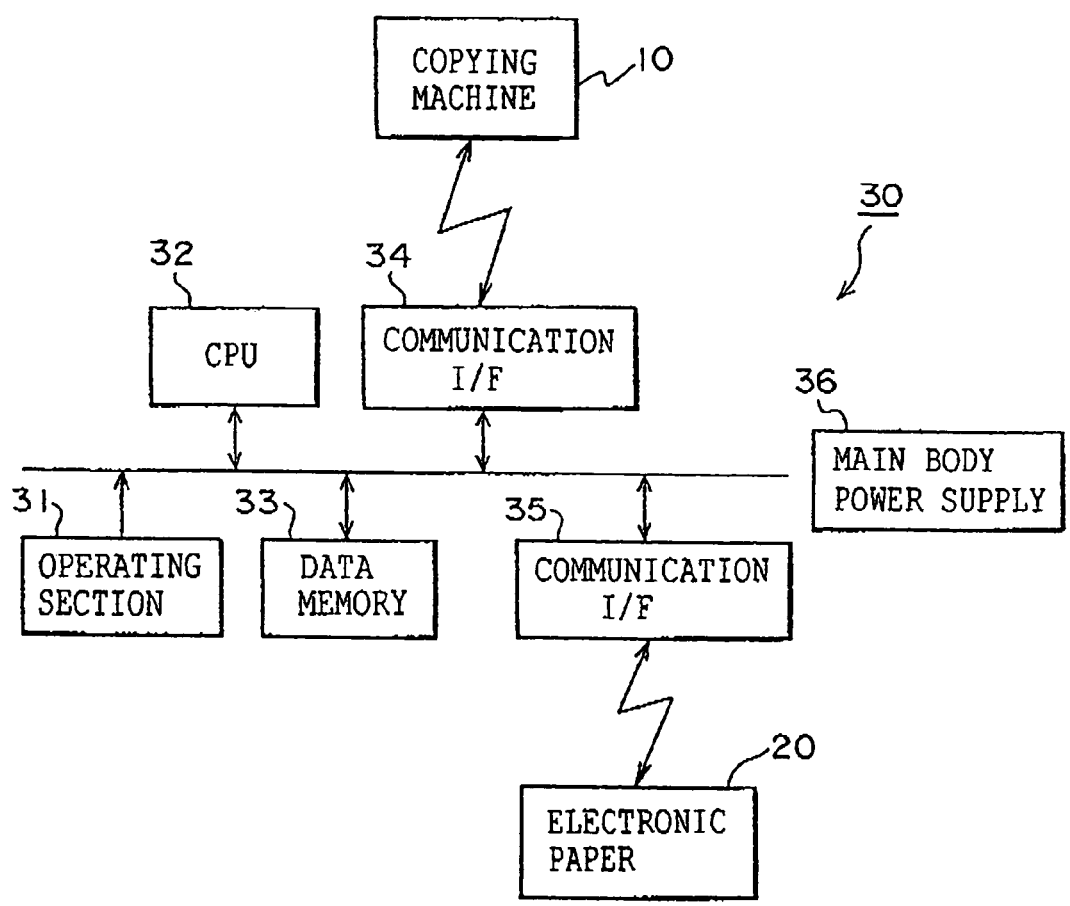
FIG. 8 is a block diagram showing a configuration of the electronic paper holding apparatus.

FIG. 8 is a block diagram showing the configuration of the electronic paper holding apparatus 30. The electronic paper holding apparatus 30 includes an operating section 31 which is operated by the operator, a CPU 32 which generally controls the electronic paper holding apparatus 30, a data memory 33 temporarily storing data which is being communicated, a communication I/F 34 which performs wireless communication with the copying machine 10, a communication I/F 35 which performs wireless communication with the electronic paper 20, and a power supply 36 which supplies the electric power to the main body of the electronic paper holding apparatus 30 and the electronic paper 20.

The CPU 32 transmits the data received from the copying machine 10 through the communication I/F 34 to the electronic paper 20 through the communication I/F 35. Also, the CPU 32 transmits the data received from the electronic paper 20 through the communication I/F 35 to the copying machine 10 through the communication I/F 34.

The copying machine 10 can mutually communicate with the electronic paper 20 through the electronic paper holding apparatus 30. Accordingly, the copying machine 10 can easily read out the necessary display characteristics from the electronic paper 20 when optically copying the image of the electronic paper 20.

Instead of the copying machine 10 reading out the display characteristics from the electronic paper 20, the operator may input the display characteristics into the operation panel 11 of the copying machine 10. That is to say, in the copying machine 10, the reading conditions of the electronic paper 20 may be automatically or manually set.

The copying machine 10 may also determine the type of the electronic paper 20 (for example, the non-light-emitting type, the light-emitting type, or the non-light-emitting type with the light source) and set the light quantity of the reading light source 12 to any value from zero to the maximum value according to the determined type of electronic paper 20.

When the electronic paper holding apparatus 30 is electrically connected to the electronic paper 20, data exchange may be carried out without the use of wireless communication.

Though the example in which the resolution is converted in step ST4 after performing the image reading has been shown as the setting of the reading resolution, the invention is not limited to this example. For example, the reading resolution of the reading section 13 may be set on the basis of the display characteristics before performing the image reading.

Second Embodiment

A second embodiment of the invention will be described below. Identical components as in the first embodiment are indicated by the same reference numerals, and overlapping description is omitted.

Similarly to the first embodiment, the copying machine 10 according to the second embodiment has the configuration shown in FIG. 1. Similarly to the first embodiment, the electronic paper 20 according to the second embodiment has the configuration shown in FIG. 2. Further, the display section 26 of the electronic paper 20 is configured so that an image can be drawn on the surface using a common writing instrument.

Even if the image added in longhand (hereinafter referred to as the "additional image") is present on the image displayed on the electronic paper 20 (hereinafter referred to as the "display image"), the copying machine 10 can obtain a high-quality image while distinguishing between the display image and the additional image.

The controller 18 of the copying machine 10 mutually communicates with the display controller 27 of the electronic paper 20 when copying the display image and the additional image of the electronic paper 20.

Figure 9:
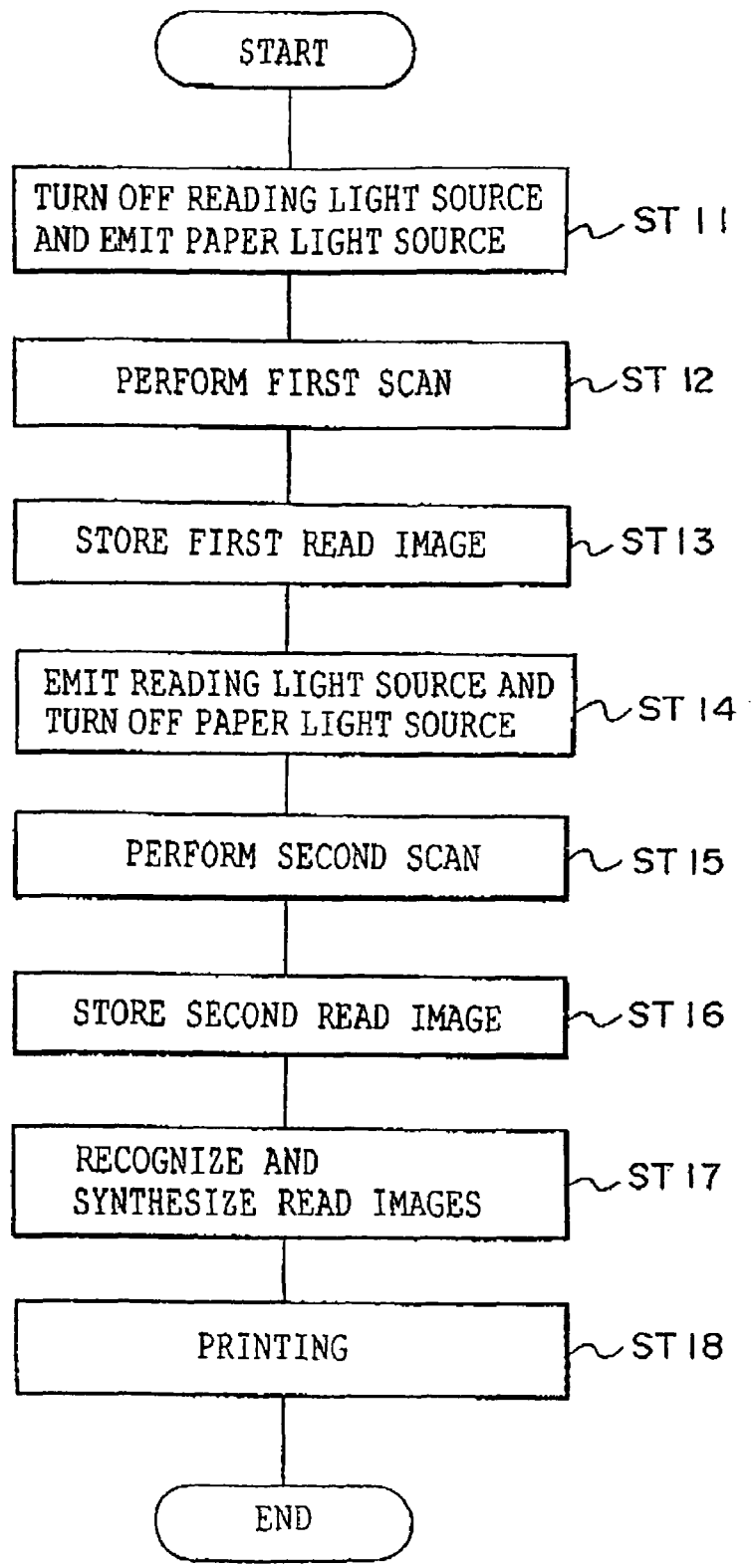
FIG. 9 is a flow chart explaining a procedure in which the controller of the copying machine copies a display image and an additional image of the electronic paper.

FIG. 9 is a flow chart explaining the procedure when the controller 18 of the copying machine 10 copies the display image and the additional image of the electronic paper 20. When the operation panel 11 instructs the performance of the copying processing, the controller 18 performs the processing from step ST11.

In step ST11, while the controller 18 turns off the reading light source 12, the controller 18 causes the paper light source 25 to emit light via the display controller 27 of the electronic paper 20. Then, the processing proceeds to step ST12. In the case where the display section 26 of the electronic paper 20 is the self-light-emitting type, the display section 26 may be caused to emit via the display controller 27.

In step ST12, the controller 18 causes the reading section 13 to perform reading processing. (first scanning) of the display image (including the additional image) of the electronic paper 20. At this point, the reading light source 12 is turned off and the paper light source 25 is caused to emit light to perform the reading processing, so that a part corresponding to a position of the additional image in the original display image is read while the part is obstructed by the additional image.

In step ST13, the controller 18 stores the first read image, which has been obtained by the reading section 13 in step ST12, into the memory 14. Then, the processing proceeds to step ST14.

In step ST14, the controller 18 causes the reading light source 12 to emit light and turns off the paper light source 25 through the display controller 27 of the electronic paper 20. Then, the processing proceeds to step ST15.

In step ST15, the controller 18 causes the reading section 13 to perform reading processing (second scanning) of the additional image of the electronics paper 20. At this point, the original display image is not displayed because the paper light source 25 is turned off. Since the additional image is written using a common writing instrument or the like, the additional image is not erased but remains even if the paper light source 25 is turned off. Accordingly, only the additional image can be read by irradiating the electronic paper 20 with the reading light source 12.

In step ST16, the controller 18 stores the second read image, which has been obtained by the reading section 13 in step ST15, into the memory 14. Then, the processing proceeds to step ST17.

In step ST17, the controller 18 recognizes the display image including the part (a shadow of the additional image), which is obstructed by the additional image, by performing predetermined image processing to the first read image. Also, by performing predetermined image processing to the second read image, while the controller 18 recognizes the additional image, the controller 18 recognizes the position of the shadow part of the additional image on the display image. On the basis of these recognition results, the controller 18 recognizes that there is no data for the part corresponding to the shadow of the additional image in the display image. The controller 18 synthesizes the display image including the part (the shadow of the additional image) obstructed by the additional image, which has been obtained by the first reading processing, and the additional image which has been obtained by the second reading processing.

For the part corresponding to the shadow of the additional image in the display image, the controller 18 may interpolate the part from the images (image portions) to the left and right and in front and in the rear of the part to recognize the entire display image. In this case, the controller 18 synthesizes the additional image and the entire display image not including the shadow of the additional image. Whether the interpolation is performed or not can be selected in advance through the operation panel 11 by the operator.

In step ST18, the controller 18 causes the printing section 15 to perform printing processing for the image synthesized in step ST17, and the processing is completed.

The display image and the additional image may be printed separately without being synthesized.

As described above, the copying machine 10 according to the second embodiment can read the display image and the additional image of the electronic paper 20 while distinguishing between them. As a result, each of the display image and additional image can be printed with high quality.

The invention is not limited to the second embodiment. For example, though the controller 18 performs the first scan followed by the second scan, the first scan and the second scan may be performed in the reverse order. Further, instead of performing the first scan, the controller 18 may directly read out the display image from the image memory 23 through the display controller 27 of the electronic paper 20 and synthesize the display image and the additional image distinguished by the second scan.

In the case of the so-called self-light-emitting type of electronic paper 20, the copying machine 10 may be configured so as not to include the light source 12. In step ST14, instead of turning off the paper light source 25, the controller 18 may perform control so that a white background is output over the display surface in order to emphasize the additional image. Further, as long as the additional image can be emphasized, the controller 18 may also perform control so that another uniform color such as gray is output over the display surface.

The example in which the common writing instrument is used in order to draw the additional image on the display surface of the display section 26 was shown However, the invention is not limited to the example. Any writing instrument may be used as long as a readable image is formed on the display surface of the display section 26. Further, the additional image is not limited to an image drawn in longhand with the writing instrument, and the additional image may be formed by putting a sheet of paper or the like, on which the image is printed, on the display surface of the display section 26.

Third Embodiment

A third embodiment of the invention will be described below. Identical components as in the first embodiment are indicated by the same reference numerals, and overlapping description is omitted.

Similarly to the first embodiment, the copying machine 10 according to the third embodiment has the configuration shown in FIG. 1. Similarly to the first embodiment, the electronic paper 20 according to the third embodiment has the configuration shown in FIG. 2. In the present embodiment, the copying machine 10 can obtain a high-quality image with no flaws by detecting a flaw on the display section 26 of the electronic paper 20.

The controller 18 of the copying machine 10 mutually communicates with the display controller 27 of the electronic paper 20 to control scanning of the display image of the electronic paper 20.

Figure 10:
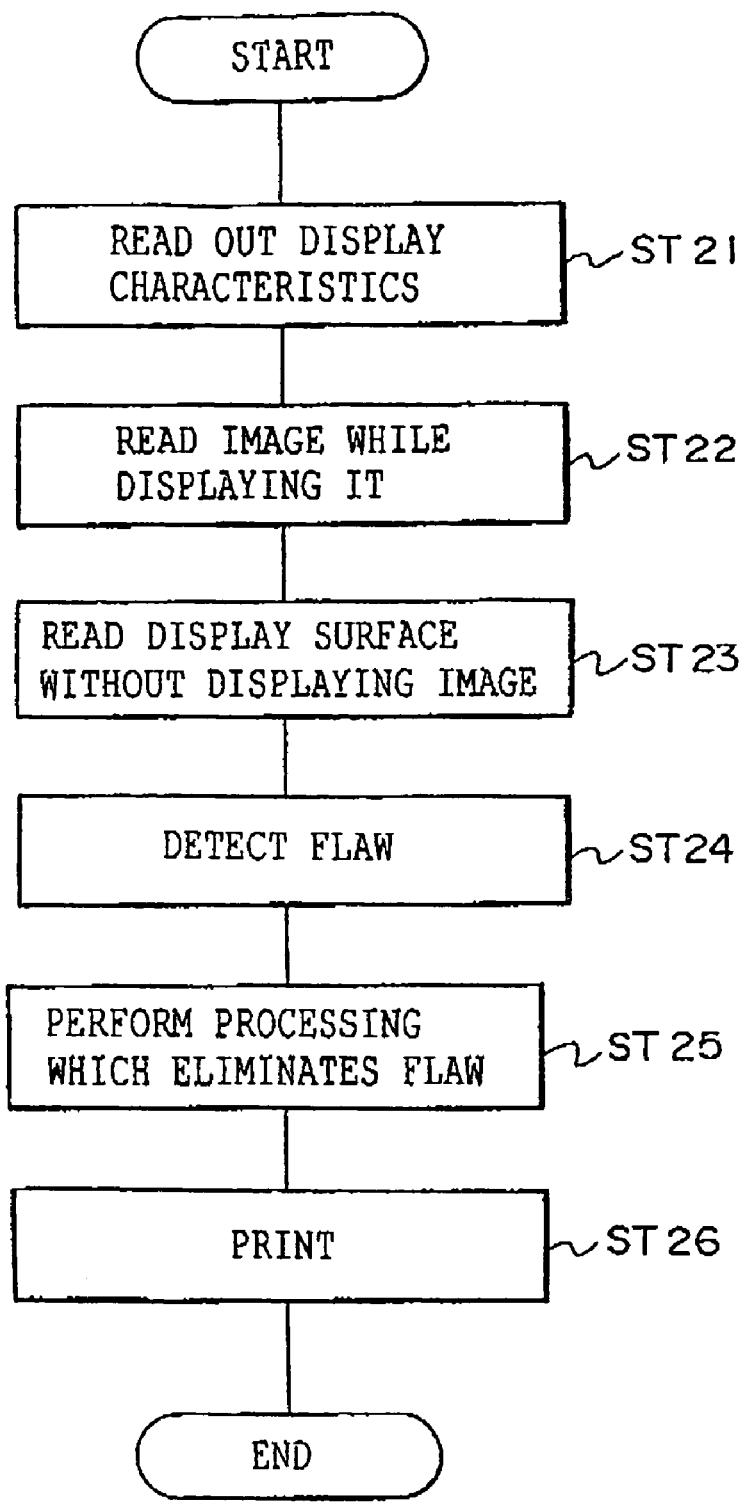
FIG. 10 is a flow chart explaining a procedure in which the controller of the copying machine copies the display image of the electronic paper.

FIG. 10 is a flow chart explaining the procedure when the controller 18 of the copying machine 10 copies the display image of the electronic paper 20. When the operation panel 11 instructs the performance of the copying processing, the controller 18 performs the processing from step ST21.

In step ST21, the controller 18 reads out the display characteristics from the display characteristic memory 24 through the display controller 27 of the electronic paper 20, and the display characteristics are stored in the memory 14. Then, the processing proceeds to step ST22.

In step ST22, while the controller 18 causes the display section 26 to display the image through the display controller 27 of the electronic paper 20, the controller 18 reads the image displayed on the display section 26 using the reading section 13. A third read image (the display image influenced by the flaw on the display section 26) which has been read by the reading section 13 is stored in the memory 14. Then, the processing proceeds to step ST23.

In step ST23, while the controller 18 erases the image of the display section 26 through the display controller 27 of the electronic paper 20, the controller 18 reads the display surface of the display section 26 using the reading section 13. A fourth read image (the image in which the flaw on the display section 26 appears) which has been read by the reading section 13 is stored in the memory 14. Then, the processing proceeds to step ST24.

In step ST24, the controller 18 detects the flaw in the display section 26 of the electronic paper 20 on the basis of the display characteristics stored in the memory 14 and the fourth read image. Then, the processing proceeds to step In step ST25, the controller 18 performs flaw eliminating processing which erases influence of the flaw on the display section 26 from the third read image stored in the memory 14. Then, the processing proceeds to step ST26. As the flaw eliminating processing, for example, an image portion located at the flaw may be interpolated from the surrounding image portions.

In step ST26, the controller 18 supplies an image in which the flaw eliminating processing has been completed to the printing section 15, and causes the printing section 15 to print the image, so as to complete the processing.

As described above, by reading the image with the flaw while the image is displayed on the display section 26 of the electronic paper 20 and reading the image in which only the flaw is displayed while the image is not displayed on the display section 26, the copying machine 10 according to the third embodiment can obtain a flawless image from the image with the flaw. Also, the copying machine 10 can detect the flaw on the display surface without using a special light source such as an infrared light source. As a result,.the copying machine 10 can optically copy a high-quality image from the electronic paper 20.

The invention is not limited to the third embodiment. For example, the controller 18 of the copying machine 10 is not limited to the order shown in FIG. 10, and the controller 18, needless to say, may read the third read image after reading the fourth read image.

A display medium utilizing any display mode such as the electrophoresis mode, the thermal rewritable mode, the EL mode, the field emission mode, the plasma mode, the liquid crystal mode or the like may be used as the electronic paper 20.

Further, the invention is not limited to the above-described embodiments, and the invention may be configured to combine contents of the first to third embodiments.

The image reading apparatus according to the invention can read a high-quality image by reading the image displayed on the display section on the basis of the display characteristics read out from the thin display device.

By performing the image processing to the read image on the basis of the display characteristics read out from the thin display device, the image reading apparatus according to the invention can obtain a high-quality image while considering the display characteristics of the read image.

Since the image reading apparatus according to the invention sets the light quantity of the reading light source in accordance with the type of light emission of the thin display device and reads the image of the thin display device, even if the types of light emission of the thin display devices are different, the image reading apparatus can always obtain a high-quality image.

The image reading apparatus according to the invention can separately deal with each of the image displayed on the thin display device and the image added to the display surface of the thin display device in a manner that separately recognizes the images, on the basis of an image read when the thin display device is caused to emit light so as to display the image on the thin display device and the reading light source is turned off and an image read when the thin display device is not caused to emit light and the reading light source is caused to emit light.

The image reading apparatus according to the invention can eliminate the influence of a flaw on the display surface to obtain a high-quality image by recognizing the image displayed on the thin display device on the basis of an image read when the image is displayed on the thin display device and an image read when the image is not displayed on the thin display device.

What is claimed is:

1. An image reading apparatus comprising:
a type determining section which determines a display mode of a thin display device;
a reading light source which irradiates the thin display device with light;
a light quantity setting section which sets a light quantity of the reading light source on the basis of the display mode determined by the type determining section; and
an image reading section which reads the image displayed on the thin display device,
wherein said light quantity varies linearly.

2. An image reading system comprising:
a thin display device having a display section which displays an image based on display image data and has a surface upon which an additional image is drawn; and
an image reading apparatus having:
  a reading section which reads the display section,
  a controlling section which controls the reading section to read the display section when the image based on the display image data is not displayed on the display section and to read the display section when the image based on the display image data is displayed on the display section, and
  a synthesizing section which synthesizes read image data obtained by reading of the display section by the reading section when the image based on the display image data is not displayed on the display section, and read image data obtained by reading of the display section by the reading section when the image based on the display image data is displayed on the display section.

3. An image reading system comprising:
a thin display device having a display section which displays an image based on display image data and has a surface upon which an additional image is drawn; and
an image reading apparatus having:
  a reading section which reads the display section,
  a controlling section which controls the reading section to read the display section when the image based on the display image data is not displayed on the display section, and
  a synthesizing section which synthesizes the display image data and read image data obtained by reading of the display section by the reading section when the image based on the display image data is not displayed on the display section.

4. An image reading apparatus comprising:
an image reading section which reads a display surface of a thin display device; and
an image processing section which performs image processing with respect to first read image data, on the basis of the first read image data obtained by reading of the display surface by the image reading section when an image is displayed on the thin display device and second read image data obtained by reading of the display surface by the image reading section when the image is not displayed on the thin display device, wherein the image processing section recognizes data corresponding to a flaw of the display surface based on the second read image data and substitutes other data for the data at a position corresponding to the position of the flaw in the first read image data.

5. A method of reading an image comprising the step of reading a display section of the thin display device using an image reading apparatus when the image based on display image data is not displayed on the display section of the thin display device, in which an additional image can be drawn on a surface of the display section which displays the image based on the display image data,
  further comprising of the step of reading the display section when the image based on the display image data is displayed on the display section, and
  further comprising the step of synthesizing read image data obtained by reading the display section when the image based on the display image data is not displayed on the display section and read image data obtained by reading the display section when the image based on the display image data is displayed on the display section.

6. A method of reading an image comprising the step of reading a display section of the thin display device using an image reading apparatus when the image based on display image data is not displayed on the display section of the thin display device, in which an additional image can be drawn on a surface of the display section which displays the image based on the display image data, and further comprising the step of synthesizing the display image data and read image data which is obtained by reading the display section when the image based on the display image data is not displayed on the display section.

7. A method of reading an image comprising the steps of:
  performing first reading processing in which a display surface of a thin display device is read using an image reading section when the image is displayed on the display surface;
  performing second reading processing in which the display surface of the thin display device is read using the image reading section when the image is not displayed on the display surface; and
  performing image processing with respect to first read image data on the basis of the first read image data obtained by the first reading processing and second read image data obtained by the second reading processing,
  wherein the step of performing image processing further includes recognizing data corresponding to a flaw of the display surface based on the second read image data; and
  substituting other data for the data at a position corresponding to the position of the flaw in the first read image data.

8. An image reading apparatus comprising:
  an image reading section which reads an image displayed on a thin display device;
  a controlling section which controls switching between a first mode in which the thin display device is caused to emit light to display the image, and a second mode in which the thin display device is not caused to emit light and the image is not displayed; and
  a recognizing section which recognizes the image displayed on the thin display device and an image added to a display surface of the thin display device based on an image read by the image reading section in the first mode and an image read by the image reading section in the second mode, wherein the image displayed on the thin display device and the image added to the display surface of the thin display device are read separately by the image reading section.

* * * * *